(12) United States Patent
Rosendahl (10) Patent No.: US 11,387,650 B2
(45) Date of Patent: *Jul. 12, 2022

(54) ELECTRICAL POWER TRANSMISSION

(71) Applicant: Glenn Kenton Rosendahl, Elie (CA)

(72) Inventor: Glenn Kenton Rosendahl, Elie (CA)

(*) Notice: Subject to any disclaimer, the term of this patent is extended or adjusted under 35 U.S.C. 154(b) by 52 days.

This patent is subject to a terminal disclaimer.

(21) Appl. No.: 17/021,395

(22) Filed: Sep. 15, 2020

(65) Prior Publication Data

US 2021/0066916 A1 Mar. 4, 2021

Related U.S. Application Data (60) Division of application No. 16/597,553, filed on Oct. 9, 2019, now Pat. No. 10,855,078, which is a division of application No. 15/790,879, filed on Oct. 23, 2017, now Pat. No. 10,491,002, which is a continuation-in-part of application No. 14/920,135, (Continued)

(51) Int. Cl.
| | |
|---|---|
| *G06F 1/26* | (2006.01) |
| *H02J 3/14* | (2006.01) |
| *G05B 15/02* | (2006.01) |
| *H02J 3/16* | (2006.01) |
| *H02J 3/18* | (2006.01) |
| *H02J 3/38* | (2006.01) |
| *G06F 1/32* | (2019.01) |
| *H02J 3/32* | (2006.01) |

(52) U.S. Cl.
CPC ............. *H02J 3/14* (2013.01); *G05B 15/02* (2013.01); *G06F 1/26* (2013.01); *H02J 3/16* (2013.01); *H02J 3/18* (2013.01); *H02J 3/1828* (2013.01); *H02J 3/1835* (2013.01); *H02J 3/38* (2013.01); *H02J 3/383* (2013.01); *H02J 3/386* (2013.01); *G06F 1/32* (2013.01); *H02J 3/32* (2013.01); *Y02B 70/3225* (2013.01); *Y02E 40/30* (2013.01); *Y04S 20/222* (2013.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 8,954,203 B2 * | 2/2015 | Arditi | H02J 3/18 700/297 |
| 10,020,741 B2 * | 7/2018 | Yao | H02M 3/335 |

(Continued)

*Primary Examiner* — Phil K Nguyen
(74) *Attorney, Agent, or Firm* — Adrian D. Battison; Ade & Company Inc.; Ryan W. Dupuis (57) ABSTRACT

Management of an electrical power transmission network is obtained by providing at each subscriber premises a power correction system for applying a switched reactor for voltage correction across the input voltage and a sensing system defined by a pair of meters one at the supply and the second downstream of the voltage correction for detecting variations in power factor. The system includes an arrangement for balancing loads between a first phase on a first BUS and a second phase on a second BUS by calculating a required correction current by adding load currents from the first and second phases. In addition an arrangement is provided when a load is switched on and off power is supplied by or supplied to a battery for a short time and this power is reduced over a time period substantially matching or greater than said natural time constant of the power supply system.

4 Claims, 8 Drawing Sheets

Related U.S. Application Data filed on Oct. 22, 2015, now Pat. No. 9,806,524, which is a continuation-in-part of application No. 14/521,971, filed on Oct. 23, 2014, now Pat. No. 9,634,489.

(56) References Cited

U.S. PATENT DOCUMENTS

| | | | |
|---|---|---|---|
| 10,396,594 B2* | 8/2019 | Fallis | H02J 13/0075 |
| 2008/0106241 A1* | 5/2008 | Deaver | H02J 3/1828 |
| | | | 323/209 |
| 2008/0304195 A1* | 12/2008 | Lin | H02M 1/4225 |
| | | | 361/89 |
| 2010/0052426 A1* | 3/2010 | Carter | H02J 9/061 |
| | | | 307/64 |
| 2010/0332857 A1* | 12/2010 | Vogman | H02J 9/005 |
| | | | 713/300 |
| 2012/0206113 A1* | 8/2012 | Kogel | H02M 1/4258 |
| | | | 323/207 |
| 2012/0223670 A1* | 9/2012 | Kinjo | H01M 10/441 |
| | | | 320/103 |
| 2013/0201731 A1* | 8/2013 | Gu | H02M 1/4225 |
| | | | 363/21.17 |
| 2015/0012151 A1* | 1/2015 | Park | G05B 15/02 |
| | | | 700/298 |
| 2015/0365002 A1* | 12/2015 | Cao | H02M 3/285 |
| | | | 363/21.01 |

\* cited by examiner

ELECTRICAL POWER TRANSMISSION

This application is a divisional application of application Ser. No. 16/597,553 filed Oct. 9, 2019 which is a divisional application of application Ser. No. 15/790,879 filed Oct. 23, 2017 which is a continuation in part of application Ser. No. 14/920,135 filed Oct. 22, 2015 now issued as U.S. Pat. No. 9,806,524 on Oct. 31, 2017, which is a continuation in part of application Ser. No. 14/521,971 filed Oct. 23, 2014 and now issued as U.S. Pat. No. 9,634,489 on Apr. 25, 2017.

This invention relates to an electrical power transmission network designed to compensate for the power factor which arises due to reactive loads on the network and to a load control device to be used at subscriber premises on the network.

BACKGROUND OF THE INVENTION

The most challenging problems power systems face today are; power factor control, transformer load imbalance, and nonlinear loads, adding to transformer imbalance and inject disruptive harmonic currents into the system. All of these problems erode the efficiency and stability of the power system, in some cases over 40% of power is lost enroute to the customer.

Power system compensation is presently done from the top down, high voltage and high power correction equipment is installed at distribution substations. This can include static or switched capacitor banks and/or switched reactors for power factor or voltage correction, universal power flow controllers to balance loads and control bus voltages. These devices can address some of the challenges but, the costs are significant and the solutions are less than optimal. They require a large investment in engineering, custom equipment, infrastructure to mount equipment, have a low fault tolerance and require maintenance.

SUMMARY OF THE INVENTION

According to the invention there is provided a load control device for use in an electrical power transmission network where the network comprises:

a plurality of subscriber premises for receiving electrical power from a power supply system;

where the power supply system has a natural time constant of the response time of the power supply system;

each subscriber premises including a plurality of user devices on a power supply circuit;

transmission lines supplying electrical power from the power supply system with each of the subscriber premises having a drop from one of the transmission lines to a power supply inlet;

the load control device being arranged for controlling the power supplied from the power supply inlet to the user devices on the power supply circuit, the load control device comprising:

a sensing system for detecting variations in power load caused by switching on or off of a load caused by one of said user devices;

and an arrangement for creating soft load changes arranged whereby:

when a load is switched on, instead of the full load power being supplied by the power system, power is supplied by a power supply component at the subscriber premises for a short time and this power supplied is reduced over a time period substantially matching or greater than said natural time constant of the power supply system;

and when a load is switched off, instead of the full load power being released, it is used to charge the power supply component for a short time and this charging is reduced over a time period again substantially matching or greater than said natural time constant of the power supply system.

Preferably the power is supplied by the power supply component though a current inverter.

Preferably the current inverter comprises one or more half bridges.

Preferably the power is supplied by the power supply component drawn from the component through a half bridge 357 onto a DC bus and charges a DC link capacitor where this charge is then immediately inverted out onto power supply BUSes via half bridges.

According to a second aspect of the invention there is provided a load control device for use in an electrical power transmission network where the network comprises:

a plurality of subscriber premises for receiving electrical power from a power supply system;

each subscriber premises including a plurality of user devices on a power supply circuit;

transmission lines supplying electrical power from the power supply system with each of the subscriber premises having a drop from one of the transmission lines to a power supply inlet;

the load control device being arranged for controlling the power supplied from the power supply inlet to the user devices on the power supply circuit, the load control device comprising an arrangement for balancing loads between a first phase on a first BUS and a second phase on a second BUS by calculating a required correction current by adding load currents from the first and second phases which are then divided by the number of phases to determine the load current needed in each to be balanced where the differences between this average and the actual current in each phase determines a balancing correction current order.

Preferably the current orders cause the first BUS to draw current from the system side while the second BUS is caused to deliver an equal and opposite current to the load side.

Preferably the current is absorbed by the first BUS and is delivered to the second BUS hence balancing out the currents as viewed by the system or utility side.

Preferably the current flows to the first BUS through a first half bridge charging a DC link capacitor which is discharged through a second half bridge onto the second BUS.

Preferably the sensing system comprises a meter generating data relating to the standard true RMS values of voltage, current and Real Power. These values can then be used by the control system to calculate the power factor to generate a value of a required capacitive load to improve the power factor.

The power factor can where possible be improved to the maximum unity power factor so that only real power is flowing in the system. However in some cases it is necessary to apply a load which provides an improvement without reaching the theoretically optimum situation. Either the system is at maximum compensation or the system is configured to improve transformer imbalance.

Transformer imbalance is a result of unsymmetrical loading of each phase of a typical three phase system. By compensating the capacitive load of each phase independently improvements to transformer imbalance can be made. While a less than optimal solution to both power factor and load imbalance will result using just capacitor compensation the overall operation efficiency may be a best solution with available resources. The present invention in its simplest form is passive capacitive compensation for one phase only. More control of load imbalance can be made with the addition of reactive compensation components and multi-phase implementation of the control, where current imbalances can be redirected within the control to balance phase currents. These improvements come with a price in complexity and costs. The addition of distributed solar/wind generation can aid in the imbalance issues by sourcing this power to heavily loaded phases.

In some cases the system can be used to correct the waveform of the power supply to remove distortions caused by noise, improving power quality. Such noise can arise from many different user devices which do not provide linear power use. In order to correct for the noise and thus better balance the waveform of the power supply, the sensing system generates data relating to FFT spectra of the power supply waveform. The control system then uses the data from the FFT analysis to provide a correction signal at a rate significantly greater than the frequency of the power supply waveform. That is the sensing system can be used from this analysis to generate data relating Total Harmonic Distortion (THD).

A reference current waveform is in phase with the voltage wave and is sinusoidal. The error signal is built up of the results from the FFT spectra of the load current. The fundamental current frequency components are removed since no compensation is necessary. All other frequency components reduce the power quality and make up the error signal. The reference signal minus the error signal provides correction pulses to an Active Power Factor Control (APFC). The APFC shapes the incoming current into sinusoidal waves removing the power noise and improving power quality.

The APFC produces a DC current to charge a local capacitor to a high voltage. This energy can be re-inverted back into the system using a power inverter, bled away, or can be another energy source for local solar/wind generation systems. It should be mentioned this system does nothing for the power quality within the premises. The power quality is improved as viewed from the system side and limits noise from effecting premises nearby. The present invention can be used to reduce noise of problem loads within a premises, such as variable speed drives in industrial settings. Where the control is installed to monitor and compensate a specific load or group of loads.

Preferably the sensing system comprises a first meter generating data at the drop and a second meter generating data downstream of the power correction system. Both meters provide the same parameters obtained from the power supply so that the data can be compared. For example, the control system can be used to compare the output data from the second meter with the output data from the first meter to determine a level of improvement in the power factor obtained by the power correction system. This comparison provides a self-accounting function where the level of ongoing improvement in the power factor can be monitored. This value can be used if required in a calculation of a rebate to the customer for that improvement and can be used to monitor over a set of premises on a particular transmission line where and how improvements are being made at the premises level which can be compared with improvements detected at the macro level at the relevant transformer. That is the load control device is arranged to communicate using the communication system data relating to the improvement to the network control system. In addition the load control device can be arranged to communicate data relating to the Real power to the network control system. This provides data to the network management system of the operation of the system and the premises allowing better control of the network at the supply end.

Typically the power correction system comprises static or switched capacitor banks. These banks can be switched in and out as required by the control system to provide a value of capacitive load to manage the power factor. For example a binary system can be employed using a number n of capacitors each twice the value of the previous to provide up to $2^n$ different values for close management of the capacitive load. Finer power factor control can be achieved with a switched reactor in parallel with the capacitor bank. Adjusting the firing angle on the reactor, an infinite resolution of current can be achieved from its maximum current rating to zero. This enables the system to track the power factor very accurately.

In addition to the control of the capacitive load, it is also possible in some cases to provide in the power correction system an Active Power Factor Control (APFC). This is a known arrangement which can be switched at high rate to filter out the noise and Total Harmonic Distortion detected by the FFT analysis. The switch, which can be operated at high rate of multiple times per cycle, connects in and out of the circuit an inductor which therefore changes the input current draw in a manner to smooth out the effects generated by the noise from the user devices. The switch is thus operated in response to the error signal derived from FFT analysis of the waveform of the power supply for current correction. This system draws energy from the system which can be bled away with a resistor, be another energy source for local solar/wind generation, or be the source for a local power inverter. Ideally this should be coupled with a local solar/wind generator since these systems already have an integrated power inverter saving installation costs. Wasting this energy through a bleeding resistor is only convenient if the losses are minimal and doesn't warrant the additional costs of a power inverter.

In addition the load control device can include a system for disconnecting from the power supply circuit within the user premises certain ones of the user devices for load shedding. This is typically carried out by a switch on one or more of the drop cables of the circuit to disconnect high load items such as heating and cooling systems.

The control system can also be programmable to change the response to variations detected by the sensing system. That is the control system can use adaptive intelligence to change the output controlling the power correction system in response to detected variations depending on different circumstances. Such change of the output might use time of day or the input voltage or power factor as parameters in the programming. The system operates to maintaining a power factor or voltage at a point or a weighted combination of several parameters to meet a required condition.

In addition, the control system can be programmable by data received by the communication system from the network control system. That is the network control system may communicate to the individual control systems of the load control devices instructions which depend on the state of the network as detected at the head end of the network. This instruction may be to control the components particularly the power correction system in a manner different from that which would be used by the system in the absence of information from the network control. Thus voltages and load shedding can be controlled centrally by instructions from the network. In this way an interactive communication system can be set up where the communication system operated bi-directionally to supply information to the network control system and to receive instructions obtained from the network either as a result of that information or from other data obtained conventionally from the network.

Typically the communication protocol is not set up to require high speed communication of complex instructions in real time to the multitude of subscriber premises but instead the system typically will be adaptive to generate programming over time which changes in response to detected data. Thus the central network control can communicated programs to the load control devices over time which are implemented on a real time basis depending on data detected locally. However high speed communication techniques can be used to manage the system in real time. The communication system can be setup to provide a synchronizing pulse periodically to controls in the field. This enables the system to take a global snap shot of measures throughout the system enabling better tracking of power and accessing of system stability.

As is well known the voltage on the transmission line can vary depending on the distance from the head end and also it is known that the voltage can be managed by reactive loads particularly capacitive loads applied to the transmission line at various positions along the line. Using this knowledge, the control system at all or some of the individual premises can be operated to change voltage at the respective drop in response to data provided by or communicated by the network control system. That is the local control system can be used to add capacitive load or to shed loads in response to data from the network control system. In this way instability in the network can be detected early by data from the local load control devices and can be better managed by operating the local load control devices to take steps to ameliorate the stability problems. For example a voltage profile along the transmission line can be managed in this way. The network control system can arrange the individual premises control systems to react to system events in order to maintain stability. Much like cruise control setting the voltage and turning loads on or off to keep the voltage measure constant. This method has a net effect of leveling the voltage graduation along a transmission line such that the overall voltage drop across a line is reduced.

Power systems are beginning to employ variable voltage transformers to manage overall power usage of systems during peak periods. By lowering the system voltage, loads draw less current which means less overall power is delivered making the most of available resources. Variable voltage transformer efficiencies are increased by the ability of the arrangement herein to minimize the overall drop of a distribution line, thus allowing greater voltage drops while still maintain rated voltage tolerances within each premises.

The network herein also can be used to control a power supply system, such as solar power stored in battery banks, at the subscriber premises for adding power to the power at the premises. That is the control system can be arranged to control the capacitor banks, any load shedding and any power added by the power supply system in response to the detected variations. The local variations can be used in conjunction with data communicated from the network control system to control these components to better manage the network.

According to a second aspect of the invention there is provided a load control device for use in individual subscriber premises of an electrical power transmission network comprising a plurality of subscriber premises for receiving electrical power, each including a plurality of user devices on a power supply circuit, at least some of which cause power factor variations when operated; transmission lines supplying electrical power; and a network control system for controlling the supply of power on the transmission lines where each of the subscriber premises has a drop from one of the transmission lines to a power supply inlet;

the load control device being arranged for connection to a respective one of the power supply inlets for controlling the power supplied from the power supply inlet to the user devices on the power supply circuit, the load control device comprising:
a sensing system for detecting variations in power factor caused by the user devices;
a power correction system for applying a capacitive load to the power supplied by the drop to the subscriber premises;
a control system for controlling the power correction system in response to variations detected;
and a communication system for communicating between the load control device and the network control system.

The load control device can be arranged to provide any one or more of the above stated features of the network.

The arrangement as described herein therefore uses a bottom up approach to power system compensation and monitoring. Instead of one large installation, many thousands of small units are distributed across a system, ideally at individual power services or loads. Point of load compensation (PLC) is the optimal placement to minimize losses and maximize system stability. Several design factors contribute to dramatically reduce costs when compared with top down solutions.

Designing compensation equipment for the low voltage side reduces component costs, increases reliability and component availability. Installation costs are minimal using well established models from the telecommunications industry.

Typical distances from substation to load are many kilometers and the top down compensation has limited effect on these transmission lines. Installing compensation closer to loads and finer resolution of compensation reduce losses even further and increases system stability and flexibility.

Deployment of these devices at the point of load gives rise to a natural communication network, the power system voltages, currents, and phasors themselves. A global communication network is provided for overall system control and synchronization. But in the absence of global communication, individual units operate as a reflexive type of control, monitoring the power system's line values and reacting to changes with best operating practices. By providing a much faster response to disturbances than a traditional system, both system stability and availability is increased. This network of power monitors and compensators gives a unique insight into the workings of each installation. Using this information, self-organizing and learning algorithms extract best operating practices for each individual system. This information can aid in almost every aspect of power system management including power theft. Current trends are pushing towards a distributed generation model with the advent of small scale solar and wind generation. The distributed generation model presents many challenges to current supervisory control and Data Acquisition (SCADA) systems, based on a centralized control ideology. The present unit can easily integrate the distributed generation model into the system and use them as active elements in power generation, system control and compensation.

One form of the present invention includes two metering points: one at the system side and one at the load side. Power compensation modules are installed between these two metering points. This unique scheme allows the effects of compensation to be measured and quantified, and forms the basis for performance contract accounting. Meter outputs from the load side (and/or system side) can be used as feedback by active compensation modules. This allows modules to nullify or reduce noise generated from problematic SMPS, CFL, LED lighting and similar nonlinear loads. Outputs from the system side meter show the results of such efforts. Each metering point is capable of measuring the standard true RMS values of voltage, current, Real Power, as well as accurately determining power factor, FFT spectra, Total Harmonic Distortion (THD), and many more. These meters are field updatable and under software control so that they may be programmed, tuned or focused on important aspects of the data to aid in control or monitoring tasks.

The dual meter structure enables compensation of visible loads and conditions avoiding any opportunity of over compensation. And hence any possibility of instability created by the compensation actions of the device. The device is inherently stable by design and can only provide compensation or actions that will improve system stability. This is all done without the need of communication with any other device, power network control, etc. This has a profound effect on network security. Where disruption of the power network by commanding (potentially millions of) these devices to do system harm is impossible!

Using a current inverter as the compensation element dramatically improves the flexibility and stability of the present invention. A current inverter measures current injected and system voltage as feedback to control the amount of current injected and the position of this current with respect to the system voltage. With the current inverter or Universal compensator any passive element or combination of (capacitor, resistor, inductor, and negative resistor) can be implemented with software using this structure. Current injection feedback control avoids any resonant interaction with external system components highlighting its inherent stable characteristic. Structures are built from half bridges which interface DC link bus(es) with AC systems or renewable energy sources. Current Inverters can be constructed with half bridges to interface to any number of AC phases or renewable energy sources (as shown in FIG. 5). At a minimum only one half bridge is required to interface a renewable energy source such as solar, wind or battery with a DC link bus. This structure has a natural modular design topology, where additions to the compensator can be made as needed. Multiple half bridges can be assembled in parallel to service an AC phase or energy source to increase current transfer capability and reduce operation noise through interleaving techniques.

Current Injection compensation uses a two meter structure with the compensation injected in-between these two meters points. When power flows from the system to the service side compensation action is determined by the service meter. Injection of correction currents, enables the entire service side to appear from the systems side as a resistive load (PF=1). The harmonic cleansing and power factor correction has a great benefit to the system. Stability margin is dramatically increased and systems with older relaying equipment benefit by removing undetectable harmonics. As local renewable energy sources are added to the service side, energy will flow both to the system and service loads. With the present two meter structure and injecting the renewable energy again in-between these two metering points the flow of this energy can be metered and conditioned using the current injection inverter used for compensation.

The system acts as a universal compensator in that the dual meter structure is particularly useful in this instance to enable reverse flow of power. Connecting a renewable source such as solar panels, wind generators, and batteries at the point of compensation between the two meter structure using a generic half bridge. This enables the inverter to not only compensate for VARs but inject real power from these renewable sources and add the required VAR compensation to these sources before they are injected into the system. The dual meter enables the tracking of this real power, the quantity and where it is delivered whether to the system, service or both. This is an important distinction from current systems available where power delivered is measured but without tracking and VAR compensation. And if VAR compensation is provided, a communication network is necessary to provide the Power and VAR orders. However in the present invention communication is not required for the device to provide VAR compensation and maintain system stability.

The inverter can be configured as a single phase, bi-phase, three phase delta or Y connected inverter, or most any poly-phase arrangement can be accommodated. If more than one phase is compensated the Inverter can also balance out the phase currents as a part of compensation, without external communication. The net effect of a multiphase compensator is the power is balanced with a unity power factor and the harmonics are scrubbed from the system. This load is now viewed from the distribution transformer as an ideal balanced resistive load.

The system provides distributed compensation in that SMPS and CFL devices, especially low wattage ones, tend by design to concentrate the drawn current at the voltage peaks. The spike of current is very narrow and large in magnitude, resembling an impulse function. This creates a large number of high current harmonics injected into the system. Further, multiple devices function to increase this peak amplitude independent of manufacturer and is an industry design practice for minimal cost. These types of loads may saturate compensation devices. The distributed compensation described herein enables multiple units in the wiring path to aid in the compensation of these loads.

Where, some attached devices may require more compensation than available at the point of load. Now all devices on a wiring path can contribute to this compensation.

The distributed compensation for VARs, Harmonic Distortion, Real Power, if a renewable power source is locally available, can take the form of devices installed along wiring paths to compensate for hardwired loads and renewables attached to these devices. Compensators built into outlets can replace standard outlets with added features for load shedding and demand side management of attached loads. Communications between these devices enable management of black out and reassertion where priority loads are reinstated first and as more power sources become available more loads are reinstated. Priorities can be hard set, by location, or digital identification tags attached to the pluggable loads such as refrigerators to set priority wherever they are plugged-in. Communication is not strictly necessary to perform the compensation functions, but is required to implement prioritized load reinstatement.

The arrangement disclosed herein provides the following unique features and advantages:

1) Dual meter structure: allows power flow reversal and accounting.

2) Distributed compensation placement improves performance and overall efficiency.

3) It can be used to remove the need for PFC circuitry to be included within consumer devices, saving costs to manufacture, the environment, time to market, and the consumer. Power network infrastructures are expected to last decades if not centuries. Whereas, consumer products have an average life of 3-5 years. If the current device circuitry is built within the power network it becomes adaptable and more resilient, reducing or eliminating the need for such circuitry to be included within consumer devices. This action can have a major impact on society and the environment.

4) It enables more useful power to be delivered through individual breaker circuits without tripping breakers or violating electrical codes. This can be very significant in older neighbourhoods where the electrical distribution network has lower capability. Typical homes in these neighbourhoods have service sizes in the 40 to 80 Amp range. This may not be enough current to run modern appliances such as air conditioners which have low power factors. By employing the present compensation methods another 20 to 30% of power would become available to help satisfy these added loads. This can be achieved without affecting the local distribution network in an adverse way, but indeed improve its operation, stability, and maximize power sales for the utility.

The arrangement herein can take many forms including a panel at the service entrance, as described in detail hereinafter. However it can also be provided as a black box along the individual wiring paths. In this form it can be used to replace outlets or can be moulded within power cords.

The arrangement herein can be used with a system for dual phase services. In this case, the outlets along wiring paths with both phases can now select which phase will be used to source loads in order to improve phase balance in a natural and transparent way.

Further, if a SMPS load is identified as the load and can operate more efficiently at 240V as opposed to 120V it can be sourced with 240V again in a natural and transparent way. Most Voltage adaptors available today are of universal voltage construction which can be sourced by 90 to 260 VAC and compatible with worldwide markets. The downside is the lower the source voltage, the lower the overall efficiency of the adaptor. Where, this new adaptation would allow these loads to operate at peak design efficiency even in 120 VAC environments.

One of the largest problems facing power systems today is the how to accommodate a large number of distributed renewable energy sources close to load centers. In some areas these distributed sources are larger than the power systems grid tie connection. The problem arises when the system suffers a power outage. How do you reinstate literally thousands of generators (distributed renewable energy sources) and thousands of loads in an orderly and stable fashion? Traditionally, the grid tie is the strongest or only source, after a power outage. The system is restarted but has to start under load of any load that was on before the power outage. This can add up to a significant load size. One of which in the near future will be beyond the grid ties capability and in this situation current methods will not work. A solution using the present invention is possible. By detecting grid instability and opening the inlet supply switch 17, the local system can be isolated from the grid. Using the available renewable energy sources and removing any non-priority loads this isolated system can continue to operate. After the grid tie connection is reestablished and stable then the local system can resynchronize with the grid and reassert switch 17, connecting the local with the greater grid once more. Demand side management is an important function of modern power system design and is an integral part of solving this most difficult power system management problem. The present invention can perform demand side management with load priority. Where the most important loads are serviced first and as more power becomes available further loads are reinitialized. Demand side management can aid in reducing the number of power outages or brownouts by removing non-priority loads when detecting signs of a weak grid (voltage droop, line frequency droop, etc) or being instructed by the network to do so.

Sequencing and prioritizing of attached loads. This has a profound effect on current power systems during reinstating a power outage. With higher and higher levels of distributed generation sources expected in power systems, coordinating and synchronizing these many sources becomes increasingly difficult. Especially in systems dominated by distributed sources where the grid tie is weak and cannot be used as a synchronizing source. Where in the present scheme, loads are removed leaving only the highest priority ones, this makes the load side weak and allow the grid tie to function as the synchronizing source for the distributed sources. As more sources become available more loads in the priority structure are reinstated. Again, this provides a natural and transparent way of solving a very difficult power network problem. And further can be done with little or no communication.

The arrangement herein can also be used for creating soft load changes. When electrical loads are turned on and off they represent a discontinuous change to the power system. These sharp changes have many negative effects on the system and in particular the magnetic forces on movable components within loads including generators, transformers, and transmission lines. These magnetic forces exert mechanical forces on the components in this equipment that can shorten their service life, cause instability, and cause failures.

Since loads change instantaneously these magnetic forces can be significant since this force is proportional to the derivative of change. Governors for generators are typically over excited to improve their response. But the effect obtained is limited by the ability of the prime mover to change speed and input power. The difference between what the system wants and what the prime mover is currently delivering causes torsion forces and stress on the equipment, with the larger the change the larger the force. All of these motor generator systems have a natural time constant which is a value known to the system. If a rate of change of the load can be kept above this natural time constant, minimum force is exerted on the equipment. Typical systems use a combination of high gain governors and high speed control communication networks to maintain stability and load response. With typical times of communication in the several millisecond range, this adds significant costs and potential reliability issues to power systems.

According therefore to a further aspect of the invention there is provided a load control device for use in an electrical power transmission network where the network comprises:

a plurality of subscriber premises for receiving electrical power from a power supply system;

where the power supply system has a natural time constant of the response time of the power supply system;

each subscriber premises including a plurality of user devices on a power supply circuit;

transmission lines supplying electrical power from the power supply system with each of the subscriber premises having a drop from one of the transmission lines to a power supply inlet;

the load control device being arranged for controlling the power supplied from the power supply inlet to the user devices on the power supply circuit, the load control device comprising:

a sensing system for detecting variations in power load caused by switching on or off of a load caused by one of said user devices;

and an arrangement for creating soft load changes arranged whereby:

when a load is switched on, instead of the full load power being supplied by the power system, power is supplied by a power supply component at the subscriber premises for a short time and this power supplied is reduced over a time period substantially matching or greater than said natural time constant of the power supply system;

and when a load is switched off, instead of the full load power being released, it is used to charge the power supply component for a short time and this charging is reduced over a time period again substantially matching or greater than said natural time constant of the power supply system.

Preferably the power is supplied by the power supply component though a current inverter.

Preferably the current inverter comprises one or more half bridges.

Preferably the power is supplied by the power supply component drawn from the component through a half bridge 357 onto a DC bus and charges a DC link capacitor where this charge is then immediately inverted out onto power supply BUSes via half bridges.

Thus the present invention can be used to remove these sharp load changes as seen by the power system.

The system can use the same configuration as shown and described herein of half bridges, one for each controlled phase and one for the neutral line. In addition, one half bridge is provided controlling an attached small rechargeable battery or other power supply storage and supply device such as a supercapacitor acting as a supplementary power supply. However other arrangements of controlling the supply of power from the storage device can be used.

The battery, if used, can be of any size but typically a very small battery can be used which only needs to be about 30 Whr, such as a typical battery used on a rechargeable drill. Then when a load is switched on, instead of the full load power being supplied by the power system, it is supplied by this battery for a short time and this power supplied is reduced over a short period matching or greater than the natural time constant of the power systems response time. Similarly when a load is switched off, instead of the full load power being released, it is used to charge the battery for a short time and this charging is reduced over this period again matching or greater than the natural time constant of the power system. The profile of the load change as seen by the power system can be tailored in software. If all loads or services use this device the system as a whole will have a longer service life, stability margin will increase, and reduce the need of high speed control communications networks.

The natural time constant of a motor or power generator machinery, the time it takes for this combination to change the output power to match the power of the loads attached, which happens continuously as power is supplied and the load changes. As an example a steam turbine and generator has a time constant to change the active output power. Where it takes time to physically open or close steam valves and time to adjust generator settings to provide the requested active power and once again bring the overall system into equilibrium (power output=power consumed). If the active power of loads is constrained by the system to change at a rate slower than this time constant then there is never a mismatch (or a very insignificant one) between power output and power consumed. Each motor/generator set has a time constant and a characteristic transfer curve where most are typically exponential in nature.

With distributed generation in the form of Solar or Wind and the power electronics used in these devices the power transfer curves may be quite varied. With the present invention this load transition curve is software programmable to match any as required by the attached motor/generation equipment. The change in the load seen by the power supply system can be controlled to provide any selected transition shape in the power requirement including a simple linear ramp or more complex.

The system herein can also be used for active load balancing between phases. With the present system, given more than one phase, loads between the various phases can be balanced. The load currents from the different phases are added then divided by the number of phases to determine the load current needed in each to be balanced. The differences between this average and the actual current in each phase determines the balancing correction current order. It is important to note this function has little cost impact on the system. The system now can provide total power quality control in other words every load appears to be a balanced resistive load no matter its makeup.

According to a further aspect of the invention there is provided a load control device for use in an electrical power transmission network where the network comprises:

a plurality of subscriber premises for receiving electrical power from a power supply system;

each subscriber premises including a plurality of user devices on a power supply circuit;

transmission lines supplying electrical power from the power supply system with each of the subscriber premises having a drop from one of the transmission lines to a power supply inlet;

the load control device being arranged for controlling the power supplied from the power supply inlet to the user devices on the power supply circuit, the load control device comprising an arrangement for balancing loads between a first phase on a first BUS and a second phase on a second BUS by calculating a required correction current by adding load currents from the first and second phases which are then divided by the number of phases to determine the load current needed in each to be balanced where the differences between this average and the actual current in each phase determines a balancing correction current order.

Preferably the current orders cause the first BUS to draw current from the system side while the second BUS is caused to deliver an equal and opposite current to the load side.

Preferably current is absorbed by the first BUS and is delivered to the second BUS hence balancing out the currents as viewed by the system or utility side.

Preferably current flows to the first BUS through a first half bridge charging a DC link capacitor which is discharged through a second half bridge onto the second BUS.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
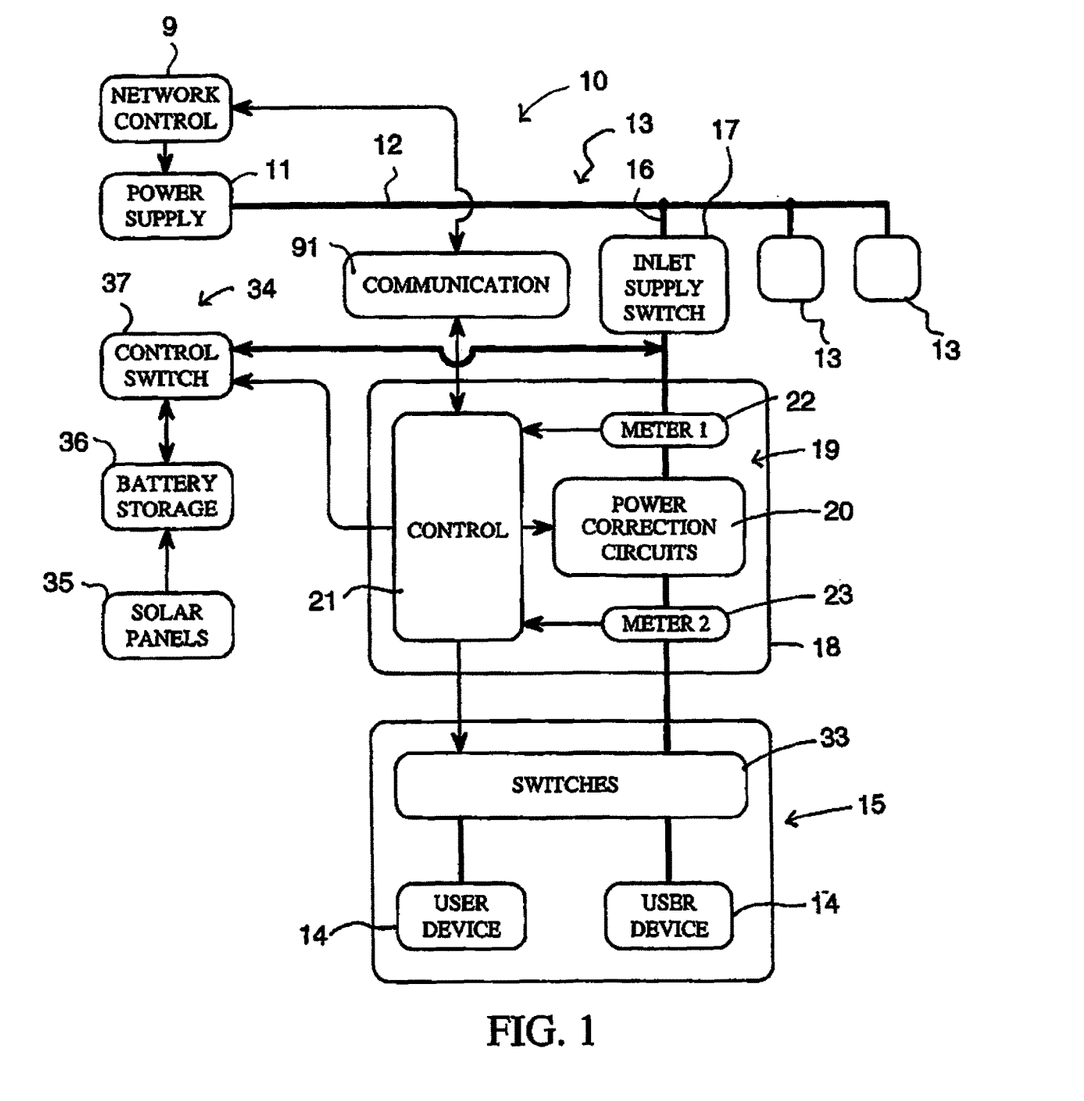
FIG. 1 is a schematic illustration of a power network according to the present invention.

An electrical power transmission network 10 includes a power supply 11 generally at a transformer supplying one or more transmission lines 12 and managed by a network control system 9 using many systems for detecting parameters of the network and for controlling various components of the network to maintain voltage stability on the transmission lines.

On the transmission line is a plurality of subscriber premises 13 for receiving electrical power, each including a plurality of user devices 14 on a power supply circuit 15. Each of the subscriber premises 13 has a drop 16 from the transmission line to a power supply inlet board 17 typically including a main inlet control switch. Typically in the drop is provided a meter for measuring power usage. In the present invention the meter is replaced by an integral component defining a load control device 18 connected to the power supply inlet 17 for controlling the power supplied from the power supply inlet to the user devices on the power supply circuit 15.

Each load control device includes a sensing system 19 for detecting variations in power factor caused by the user devices 14, a power correction system 20 for applying load corrections to the power supplied by the drop to the subscriber premises and a control system 21 for controlling the power correction system in response to variations detected. The control system 21 connects to a communication system 91 for communicating between the load control device 19 and the network control system 9.

The sensing system comprises a first meter 22 and a second meter 23 each of a generally known construction. Each acts to monitor the waveform of the power supply and to generate data relating to the standard true RMS values of voltage and current and relating to the Real Power. The sensing system can also have systems which generate data relating to FFT spectra of the power supply wave form by analyzing the waveform using conventional Fast Fourier Transform techniques. This can also be used to generate data relating Total Harmonic Distortion (THD).

The first meter is located at the drop and the second meter is located downstream of the power correction system and the control system 21 which receives the data from both acts to compare the output data from the second meter with the output data from the first meter to determine a level of improvement in the power factor obtained by the power correction system 20.

Figure 2:
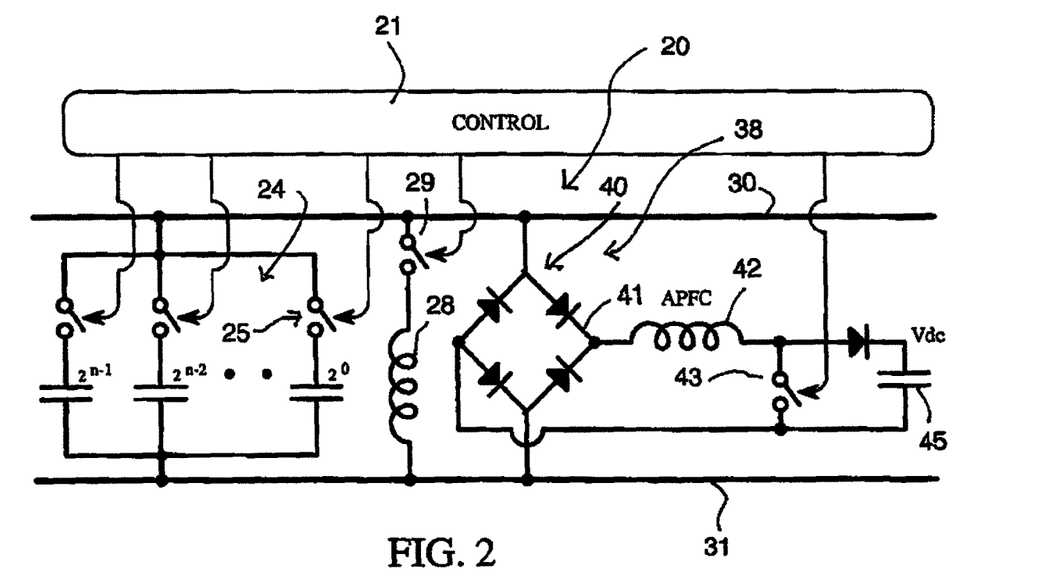
FIG. 2 is a schematic illustration of the power correction circuit of FIG. 1.

The load control device is arranged to communicate data relating to the improvement measured and to the Real Power consumed to the network control system 9. This can be done in real time but typically is periodic As shown in FIG. 2, the power correction system 20 comprises switched capacitor banks 24 including a switch 25 operated by the control 21 which switches in selected capacitors 26 in a binary switching system. The system 20 further includes a switched reactor circuit 38 for voltage correction. This includes an inductor 28 and a switch 29 connecting the inductor across the power supply buses 30 and 31. The switch 29 is operated by the control 21 in response to a leading power factor, provides greater control of power factor by varying the firing angle. Typically systems over-compensate the power factor with capacitors and use the reactor switch combination to fine tune the power factor to unity. The system 20 further includes an active power factor correction circuit 40 for noise correction and current shaping. This is composed of rectifier 41 across the supply buses 30 and 31 feeding into an inductor 42 with a switch 43 connected to the rectifier return forming a boost circuit. Output from the boost circuit feeds diode 44 and holding capacitor 45. The switch 43 is operated by the control 21 in response to noise and FFT analysis of the downstream loads. A sinusoidal waveform of the fundamental frequency minus the sum of FFT waveforms minus the fundamental is used as the input to switch 43 modulated to a high frequency. This circuit 40 shapes the load current into a sinusoid based on the measured noise from downstream loads. The charge deposited onto capacitor 45 can be bled off with a resistor (not shown), fed into a local solar/wind battery charging system, or re-inverted back onto the supply bus.

The load control device further includes a system for disconnecting certain ones of the user devices for load shedding provided by a switch 33 operated by the control 21.

The control system includes a processor which is programmable from external input from the communication system or is programmed to change the response to variations detected by the sensing system so that the response is different in different circumstances. In this way the whole system can be interactive or can be adaptive to provide improved response to better manage the whole system depending on various aspects such as time of day and voltage levels locally or globally in the system.

In particular, the control system is operated by its program to change voltage at the drop by changing the capacitive load in response to data from the network control system or other factors so as to provide another tool to the network management system to better control voltages and to better maintain stability.

Some or all of the subscriber premises can include a power supply system 34$m2$ at the subscriber premises for adding power to the power. This can comprise any of the known power supply systems such as solar panels, generators and other local systems. For example the power supply as shown includes a solar generator 35 connected to a battery bank 36 operated by a switch 37 controlled by the control 21 to take power from the drop 16 or to add power to the drop depending on data and or program instructions from the sensor system 19 or from the network control 9. Thus the control system is arranged to control the capacitor banks and the power added by the power supply system in response to the detected variations.

The dual meter structure 22, 23 enables compensation of visible loads and conditions avoiding any opportunity of over compensation. And hence any possibility of instability created by the compensation actions of the device. The device is inherently stable by design and can only provide compensation or actions that will improve system stability. This is all done without the need of communication with any other device, power network control, etc. This has a profound effect on network security. Where disruption of the power network by commanding (potentially millions of) these devices to do system harm is impossible.

Figure 3:
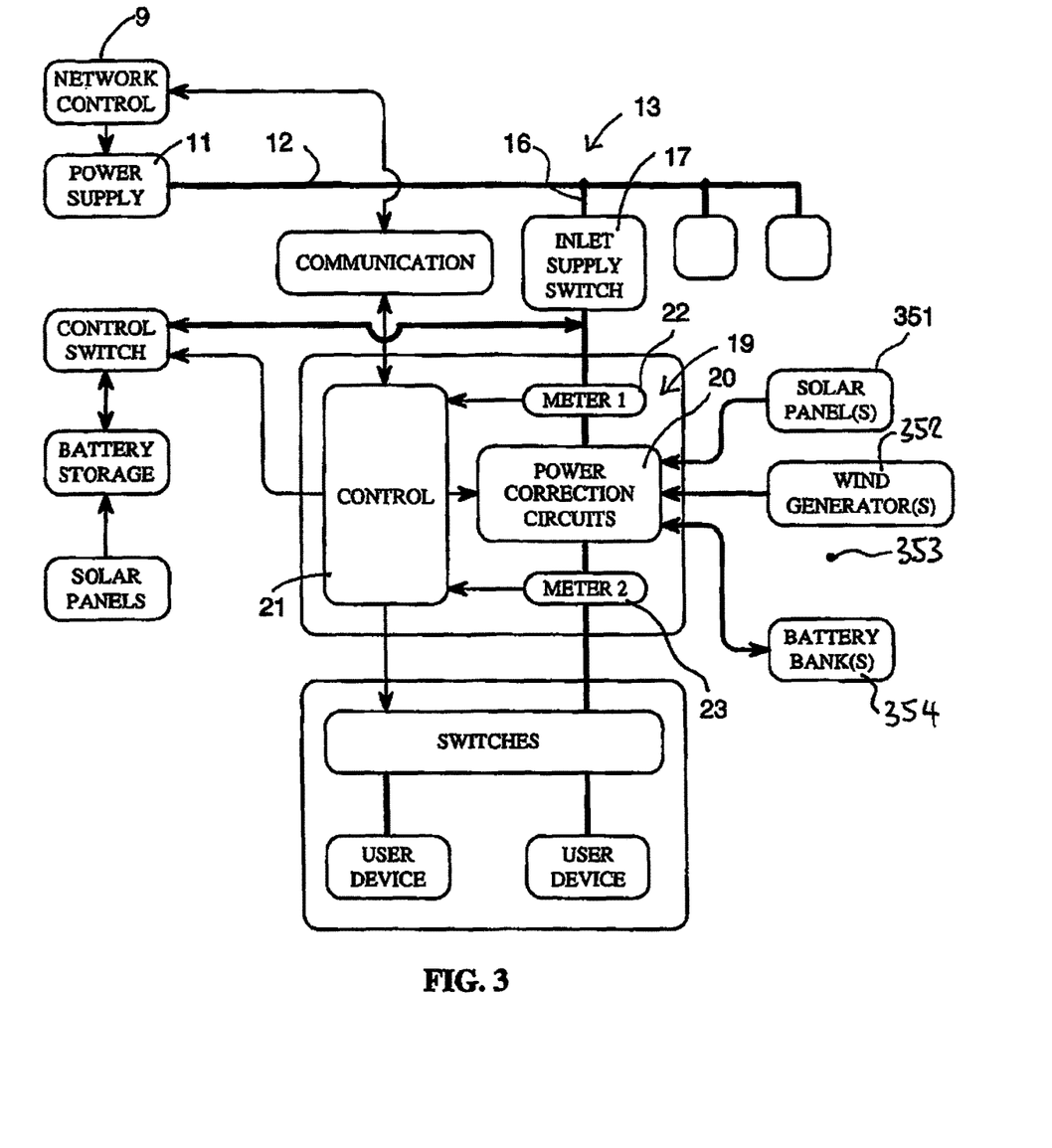
FIG. 3 is a schematic illustration of a power network according to the present invention similar to that of FIG. 1 but including further features.
Figure 4:
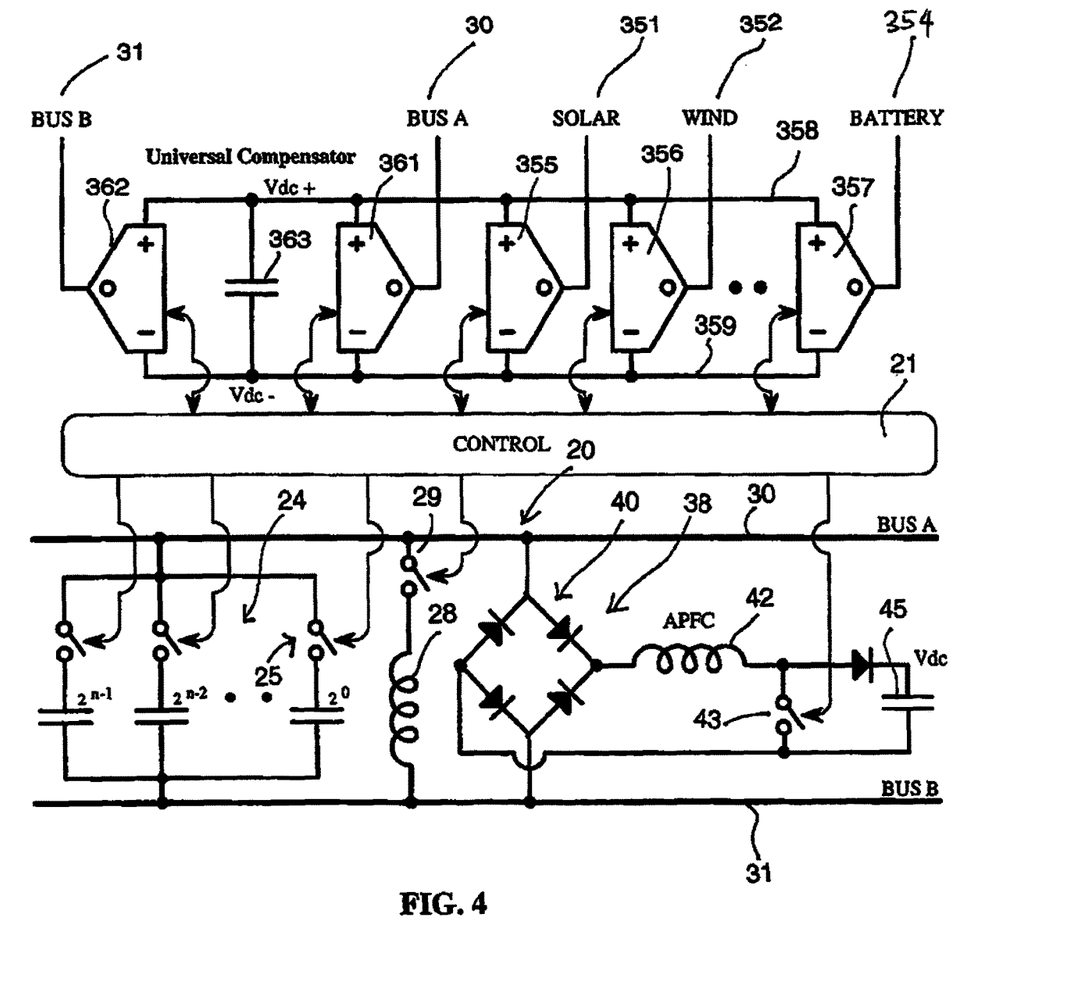
FIG. 4 is a schematic illustration of the power correction circuit of FIG. 3.

Turning now to FIGS. 3 and 4, there is shown an arrangement for connection of solar panels 351, wind generators 352, other power supplies 353 and battery banks 354 to the power correction circuit 20. In FIG. 4 the arrangement for the connection is provided which includes a series of current inverters 355, 356 and 357 arranged in a row along a pair of conductors 358 and 359. Across these conductors is also connected a pair of further current inverters 361 and 362. A capacitor 363 is also connected to the conductors 358, 359 and located between the current inverters 361 and 362.

Figure 5:
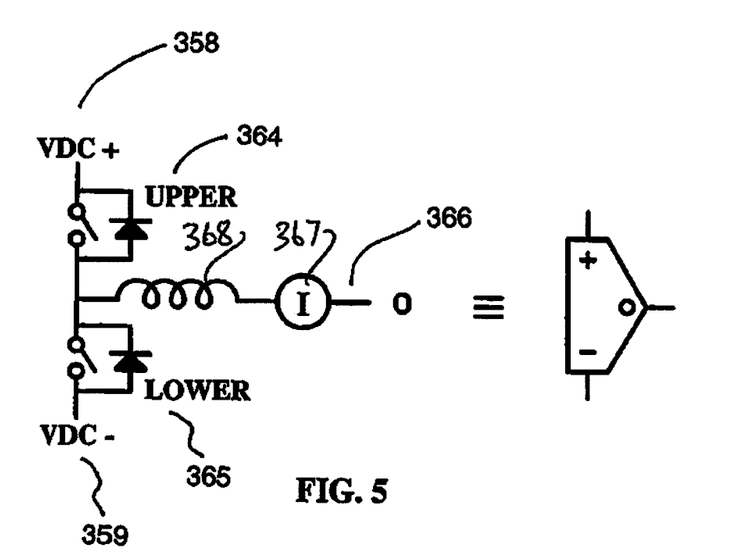
FIG. 5 is a schematic illustration of a half bridge to be used in the arrangement of FIGS. 3 and 4.

The construction of each current inverter is shown in FIG. 5 and comprises an upper switch and flyback diode 364 and the lower switch and flyback diode 365 connected across the conductors 358, 359, where the relevant input from the power source is connected at 366. When connecting to an input power source such as a solar panel, wind generator, or charged battery, the inverter acts like a boost regulator. Typically the DC link voltage is much higher than the voltage sourced by the attached renewable power sources, hence a boost conversion is necessary. The return or ground of the renewable energy source(s) is connected to point 359. The lower switch is turn on until a desired current "I" measured with 367 is built up through inductor 368. The lower switch 365 is then turned off. The inductor has a stored charged which now will discharge through the upper switch 364 flyback diode, charging the DC Link capacitor 363 connected between point 358 and 359 and finally complete the circuit through the return to the energy source connected. In this way the DC Link capacitor 363 is charged with energies that can be inverted back into the AC system via inverters 361 and 362 shown in FIG. 4. To reverse this process and charge a battery the current inverter acts like a buck converter, transferring energy from a high DC voltage source to a lower voltage. Again, the negative battery terminal is attached to point 359. To charge a battery, power from the DC Link Capacitor 363 and buses 358 and 359 the upper switch 364 is turned on until a voltage at terminal 366 is reach which is suitable for charging the battery attached. This also builds a current up within the inductor 368 and is the charging current for the battery. Then the upper switch is turned off, this current continues to charge the battery through the fly back diode of the lower switch 365, inductor 368, until the voltage/current drops to a point, where again the upper switch is turned on, repeating the cycle. The current inverter now functions as a buck converter, reducing the voltage of the DC Link capacitor to a level needed for the attached battery. Both the boost and buck conversion cycles are well known in the industry as a way to transfer energy between two DC voltages, a DC converter.

Using the current inverters as the compensation element dramatically improves the flexibility and stability of the arrangement. With the current inverter or Universal compensator any passive element or combination of (capacitor, resistor, inductor, and negative resistor) can be implemented with software using this structure. Current injection feedback control avoids any resonant interaction with external system components highlighting its inherent stable characteristic. Structures are built from half bridges 364, 365 which interface DC link buses 358, 359 with the AC systems or renewable energy sources 351 to 354. The current Inverters are constructed with half bridges to interface to any number of AC phases or renewable energy sources. At a minimum only one half bridge is required to interface a renewable energy source such as solar, wind or battery with a DC link bus. This structure has a natural modular design topology, where additions to the compensator can be made as needed. Multiple half bridges can be assembled in parallel as shown in FIG. 4 to service an AC phase or energy source to increase current transfer capability and reduce operation noise through interleaving techniques.

As shown in FIGS. 1 and 3, the current Injection compensation uses a two meter structure 22, 23 with the compensation injected in-between these two meters points. When power flows from the system to the service side, compensation action is determined by the service meter 23. Injection of correction currents, enables the entire service side to appear from the systems side (meter 22) as a resistive load (PF=1). The harmonic cleansing and power factor correction has a great benefit to the system. Stability margin is dramatically increased and systems with older relaying equipment benefit by removing undetectable harmonics. As local renewable energy sources 351 to 354 are added to the service side, energy will flow both to the system and service loads 14. With the present two meter structure and injecting the renewable energy again in-between these two metering points at the power correction circuit 20 as shown in FIG. 4, the flow of this energy can be metered and conditioned using the current injection inverter used for compensation.

The system acts as a universal compensator in that the dual meter structure is particularly useful in this instance to enable reverse flow of power. Connecting a renewable source such as solar panels, wind generators, and batteries at the point of compensation between the two meter structure using a generic half bridge. This enables the inverter to not only compensate for VARs but inject real power from these renewable sources and add the required VAR compensation to these sources before they are injected into the system. The dual meter 22, 23 enables the tracking of this real power, the quantity and where it is delivered whether to the system, service or both. This is an important distinction from current systems available where power delivered is measured but without tracking and VAR compensation. And if VAR compensation is provided, a communication network as provided by the communication system 91 to the network 9 is necessary to provide the Power and VAR orders. However in the present invention communication system 91 is not required for the device to provide VAR compensation and maintain system stability.

The arrangement shown in FIG. 4 can also be used for generating soft load changes. When a load is turned on and off it causes a discontinuous change to the power system as shown in FIG. 8.

Figure 8:
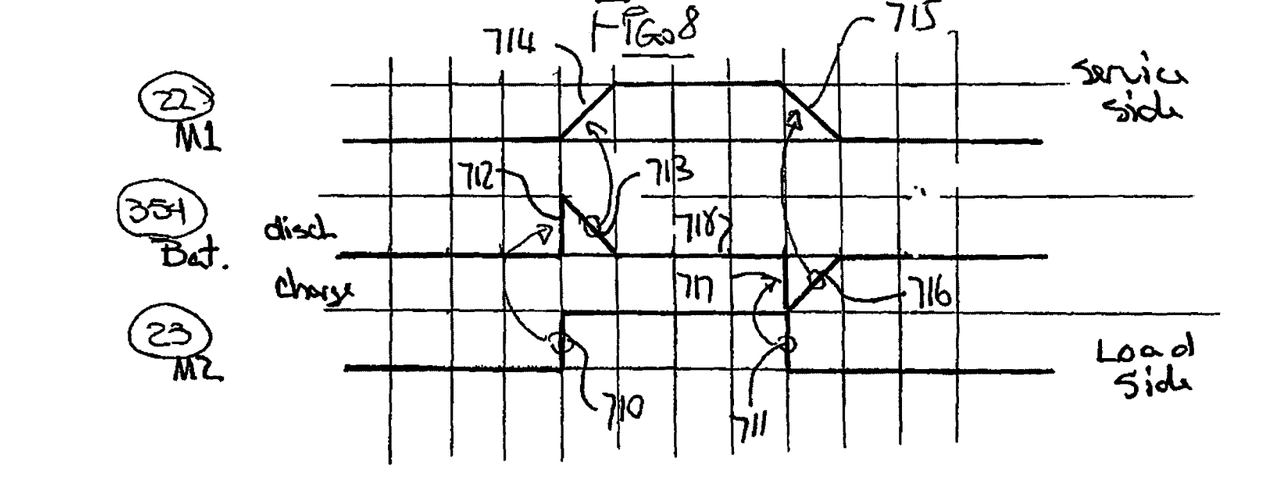
FIG. 8 is a schematic illustration of the switching of a load and the operation of the battery in the soft load system of FIG. 7.

Referring to FIGS. 2, 4, 5 and 8, when a new load 710 (FIG. 8) is introduced, it is seen by the second meter 23 (FIG. 1) and immediately power is drawn, as shown at 712 in FIG. 8, from the battery 354 through half bridge 357 onto DC bus 358, 359 (FIG. 5) and charges DC link capacitor 363 (FIG. 4) this charge is then immediately inverted out onto BUS A 30 and BUS B 31 via half bridges 361 and 362. In this way the system is spared the shock of the new load as it is absorbed by the local battery 354. Then, over a short period of time matching the overall systems natural time constant, this power supplied by the battery 354 is diminished as indicated at 713 in FIG. 8. This power is replaced by the system but at a rate the system can naturally accommodate minimizing mechanical and electrical stresses throughout the system. In this way the battery power is no longer needed to supplement the new loads power. Again, the system and loads are in equilibrium and no change is necessary, as indicated at 718 in FIG. 8. Upon removing a load as shown at 711 in FIG. 8, power from the system continues in excess of the attached loads, this excess power is immediately drawn from the system via BUS A 30 and BUS B 31 through half bridges 361 and 362 charging the DC link capacitor 363 via DC BUS 358 and 359. This energy is then immediately used to recharge the battery 354 via DC bus 358 and 359 and half bridge 357 as indicated at 717. Again in this way the system avoids the shock of this load' being removed, it is absorbed by the local battery. Again over a short period of time matching the overall system natural time constant, this power is returned to the battery as indicated at 716 in FIG. 8, and the power requirement of the system is reduced in a gradual way minimizing mechanical and electrical stresses throughout the system. It should be noted that using this gradual assertion and removal of load currents, as seen by the system, reduces (if not eliminates) the need for control communication, increasing system stability both mechanically and electrically, and minimizes mechanical and electrical stress. For the purpose of simplicity, simple linear ramps are used for the transitions 713, 714, 715, and 716 shown in FIG. 8. Where any transition shape may be used and is under the complete control of software, further the new load assertion transition shape may differ from the load removal transition shape. What shape is optimal is system dependent.

Thus the system uses the standard configuration shown and described herein of half bridges or current inverters as shown in FIG. 4. In this way, when a load is switched on, instead of the full load power being supplied by the power system, it is supplied by this battery 354 for a short time and this power supplied is reduced over a short period matching or greater than the natural time constant of the power systems response time. Similarly when a load is switched off, instead of the full load power being released, it is used to charge the battery for a short time and this charging is reduced over this period again matching or greater than the natural time constant of the power system. The profile of the load change as seen by the power system can be tailored in software of control unit 21.

Figure 7:
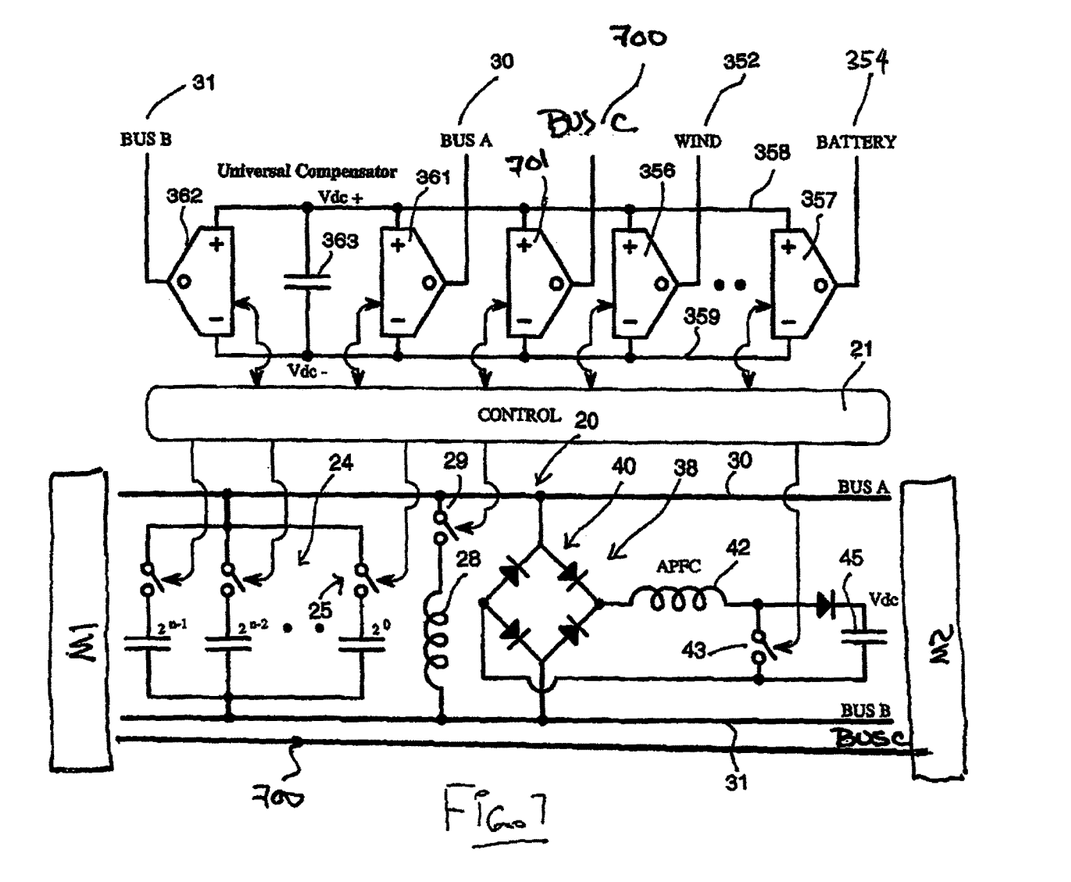
FIG. 7 is a schematic illustration of the power correction circuit of FIG. 4 modified to show active load balancing between phases.

Referring now to FIG. 7, there is provided an arrangement for active load balancing between the different phases at the consumer premises by which loads between the various phases can be balanced. Thus two source phases BUS A 30 and BUS B 31 and a return phase BUS C 700 (more commonly known as Neutral) comprises a dual phase system as is commonly found in homes. Many loads within a home are attached from one phase BUS A or BUS B to the return line BUS C. When the size, of loads attached to BUS A and BUS B do not equal this causes an imbalance between the current or power delivered on the two BUSes A and B and the difference between these currents is returned via BUS C. So, in order to have balanced loading on BUS A and BUS B the current in BUS C must be zero. This is not typically true since loads are rarely balanced between BUS A and BUS B. With the present invention these imbalanced currents are balanced in the view of the system or utility side using the current inverter half bridges 361 and 362 connected to BUSes A 30 and B 31.

When an imbalance is detected, the currents in BUS A and BUS B are measured by the second meter 23 (FIG. 3) and these currents are averaged. The average current minus the actual current of each BUS A 30 and BUS B 31 forms the current order for each respective half bridge 361 and 362. It should be noted for this example we are considering only balancing and not the general function of the device as it relates to balancing, harmonic mitigation, and VAR compensation. The loads in this case can be thought of being purely resistive but unequal between each BUS or phase A and B. This simplification has no effect on the process since each of these components can be treated separately and then combined at the end using the superposition theorem. These current orders will have one BUS drawing current from the system side while the other BUS will deliver an equal and opposite current to the load side. As an example, if BUS A has a load current of 15 Amps while BUS B has a load current of 5 Amps:

the current inverter for BUS A 30, which is inverter 361, will have a current order for delivering 5 Amps that is (5+15)/2=10−15=−5 Amps.

the current inverter for BUS B 31, which is current inverter 362, will have a current order of absorbing 5 Amps (5+15)/2−10−5=5 Amps.

So, current is absorbed by BUS B 31 and is delivered to BUS A 30 hence balancing out the currents as viewed by the system or utility side.

This is accomplished in this example by current flowing via BUS B 31 through half bridge 362 charging DC link capacitor 363. This charge on DC link capacitor 363 is discharged through half bridge 361 onto BUS A 30.

In general, with the present system given more than one phase, loads between the various phases can be balanced. In software, the load currents from the different phases are added then divided by the number of phases to determine the load current needed in each to be balanced. The differences between this average and the actual current in each phase determines the balancing correction current order. It is important to note this function has little cost impact on the system.

Using both of these systems, therefore, the system now can provide total power quality control in other words every load appears to be a balanced resistive load no matter its makeup.

Instead of using a battery in any location herein it is instead possible to use a super capacitors as the storage medium. Since the system typically only need a small amount of power and is constantly charging and discharging such supercapacitors are eminently suitable.

Figure 6:
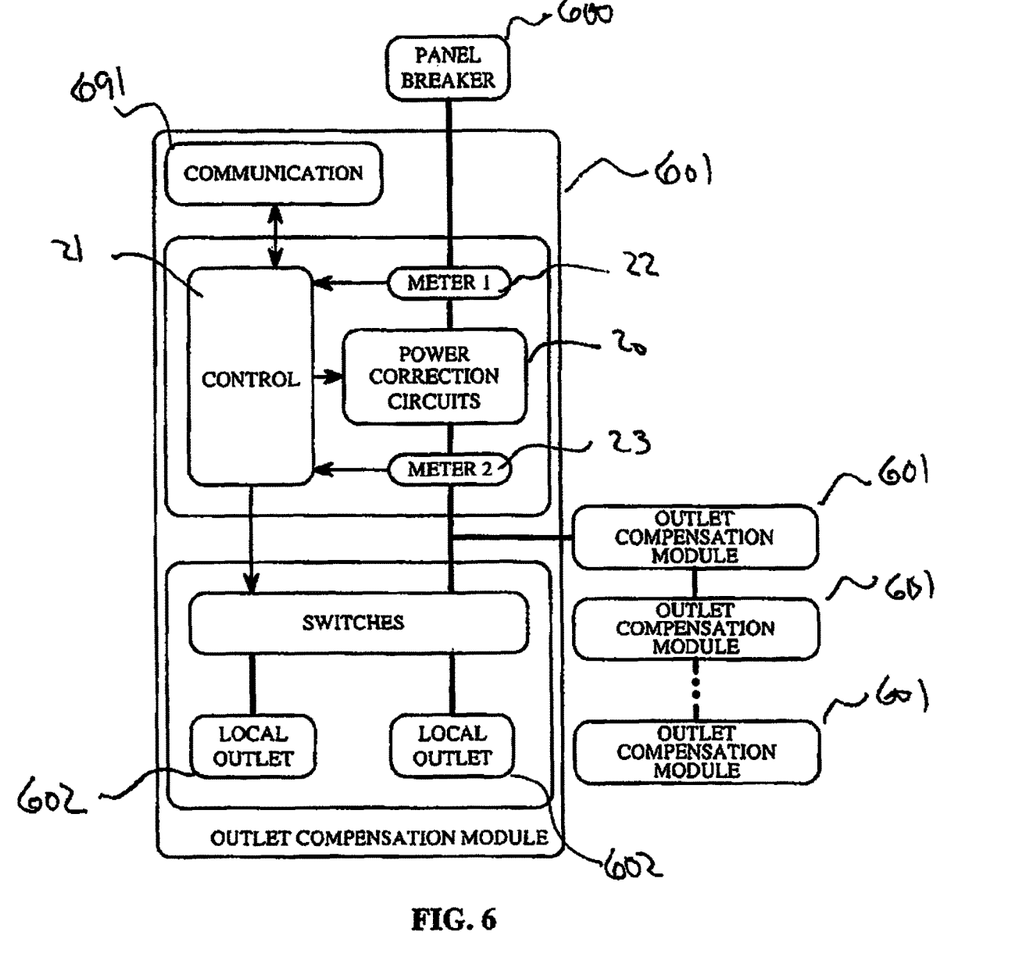
FIG. 6 is a schematic illustration of a power network similar to that of FIG. 1 showing an arrangement where the compensators are built into the outlets.

The present invention can be packaged into local outlet receptacles as shown in FIG. 6. Where each panel breaker 600 sources a wiring path with multiple outlet compensation modules 601 connected along the wiring path. This forms a distributed compensation arrangement. Each module can contain a communications interface 691 to communicate with a panel mounted compensator via communications interface 91 and/or with other like units. Again the dual meter structure within in each module enables the need for compensation and results of compensation to be measured at each location along the path. With communications all units can share this information to enable the group to maximize distributed compensation efficiency. Without communications, a natural sharing mechanism of this information is provided by placement along the wiring path. If a serial path is assumed then the module furthest away from the breaker is isolated, where that module can only see the loads attached to its local outlets 602. Each module up from the furthest one can see the effects and loads of every module further away from the panel than itself. This allows compensation to be added to loads further down the chain that could not be compensated by their local modules. While the compensation efficiency would not be as efficient as modules with communications the added cost and complexity may be unwarranted. This distributed compensation arrangement can increase the capability of the panel breaker and associated wiring by generating a loads VAR requirement locally. Then the break need only carry the real power necessary for these loads. As opposed to previously the break had to carry the real and imaginary power needs of each load. This can be significant, increasing power transfer 20 to 30% or more. All without violating established electrical codes for current capacity of wiring. This can have a great impact on older installations and homes where minimal wiring was installed and a greater need of power was unforeseen. Now, with the installation of compensation outlet modules more useful power can be carried by the same old cables installed many years ago, breathing new life into older structures.

Demand side management and prioritize load identification and management functions require the communications interface of 691. Demand side load commands are received by each module and the appropriate loads are either attached or detached depending on the order. With a power network control communications connection such as 9 finer power system demand management schemes are possible where millions of loads maybe identified by importance, class (chargers, heating, cooling, etc), size, noise content, etc. This would enable a greater and finer control of load profiles to match availability of network power, time of day, and types of power, renewable or grid, etc. Upon a power outage all non-priority loads are removed. With the power returning loads can be reinitialized in priority order to match current power availability criteria. Demand side management and load sequencing can make a big difference to system reliability and stability, especially in power grids with a high concentration of renewable energy sources.

The invention claimed is:

1. A load control device for use in an electrical power transmission network where the network comprises:
   a plurality of subscriber premises for receiving electrical power from a power supply system;
   each subscriber premises including a plurality of user devices on a power supply circuit;
   transmission lines supplying electrical power from the power supply system to a respective power supply inlet of each of the subscriber premises;
   the load control device being arranged for controlling the power supplied from the power supply inlet to the user devices on the power supply circuit,
   the load control device comprising an arrangement for balancing loads between a first phase on a first BUS and a second phase on a second BUS by calculating a required correction current by adding load currents from the first and second phases which are then divided by the number of phases to determine a load current needed in each to be balanced where the differences between this average and an actual current in each phase determines a balancing correction current order.

2. The load control device according to claim 1 wherein the current orders cause the first BUS to draw current from a power supply system side while the second BUS is caused to deliver an equal and opposite current to a load side.

3. The load control device according to claim 1 wherein current is absorbed by the first BUS and is delivered to the second BUS hence balancing out the currents as viewed by a power supply system side.

4. The load control device according to claim 1 wherein current flows to the first BUS through a first half bridge charging a DC link capacitor which is discharged through a second half bridge onto the second BUS.

* * * * *